Patented Mar. 2, 1954

2,671,078

UNITED STATES PATENT OFFICE 2,671,078

PHOSPHORUS-CONTAINING POLYMERS

William B. McCormack, Wilmington, Del., assignor to E. I. du Pont de Nemours and Company, Wilmington, Del., a corporation of Delaware No Drawing. Application August 7, 1951,
Serial No. 240,812

12 Claims. (Cl. 260—88.7)

This invention relates to new phosphorus-containing interpolymers and to a process for obtaining them.

Most organic polymeric materials deteriorate or decompose at elevated temperatures and are flammable to such an extent that they may not be used in some applications for which their properties make them otherwise suitable.

It is an object of this invention to provide polymers which are heat-resistant and which have a high degree of stability against oxidation, reduction and hydrolysis. A further object is to provide polymers which are useful in the flameproofing of textiles. A still further object is to provide a process for the production of these polymers.

According to this invention, such stable interpolymers are prepared by the reaction of a hydroxyl-containing compound, such as water, an alcohol or a carboxylic acid, with an interpolymer of an olefinically unsaturated compound and a monosubstituted dihalophosphine. By this reaction the dihalotertiaryphosphine groups in the intermediate interpolymer are converted to phosphine oxide groups. The interpolymers containing the dihalotertiaryphosphine groups are prepared by reacting together the olefinically unsaturated compound and the substituted dihalophosphine in the presence of a free radical polymerization catalyst, as described in my copending application Serial No. 240,811.

In a typical and representative embodiment of this invention, a heat-resistant polymer containing phosphine oxide groups is prepared by first reacting acrylonitrile with dichlorophenylphosphine in the presence of an azonitrile polymerization catalyst to form an interpolymer containing dichlorotertiaryphosphine groups, and thereafter hydrolyzing this product by adding water to the reaction mixture.

Olefinically unsaturated compounds which are useful in the practice of this invention contain the radical $CH_2=C<$ and include styrene, acrylonitrile, the lower alkyl allyl ethers such as allyl methyl ether, allyl ethyl ether and allyl n-butyl ether, and the lower alkyl esters of acrylic and of methacrylic acids such as methyl acrylate, ethyl acrylate, methyl methacrylate, ethyl methacrylate, propyl methacrylate and n-butyl methacrylate. Certain other olefinically unsaturated compounds such as 1-cyano-1-carbethoxyethylene and 1,1-dicyanoethylene may also be used. All of these compounds contain groups such as the phenyl, nitrile, carbalkoxy or alkoxymethylene groups which are so situated as to activate the vinyl group for taking part in the interpolymerization under free radical conditions. Vinyl compounds such as vinyl chloride and vinyl acetate, which are not activated to the same extent, are not operable. Ketones are undesirable in this reaction, since the carbonyl group tends to react with the dihalophosphine. Mixtures of two or more unsaturated compounds may be employed.

The dihalophosphine to be used in this process has the formula $RPX_2$, in which R represents a member of the group consisting of alkyl, aryl and aralkyl radicals and X represents a member of the group consisting of chlorine and bromine. The preferred phosphines are dichlorophenylphosphine and dichloroethylphosphine. A wide variety of phosphine derivatives having the general formula shown may be employed. Representative compounds include those in which R represents an alkyl group such as methyl, ethyl, propyl, butyl or octyl; an aryl group such as phenyl or alpha- or beta-naphthyl; or an aralkyl group such as benzyl or phenylethyl. In general, the lower members of these classes of radicals are most useful. These compounds are readily available from several well known procedures, such as by the action of a phosphorus trihalide on a hydrocarbon in the presence of aluminum chloride, or by the action of a phosphorus trihalide on dialkyl or diaryl mercury. Kharasch in J. Org. Chem. 14, 429 (1949) describes a process for making dichloroethylphosphine from phosphorus trichloride and lead tetraethyl. The various procedures for making these compounds are summarized in Kosolapoff, Organophosphorus Compounds, Wiley, N. Y. (1950), chapter 3.

The polymerization reaction is carried out with the aid of a free radical polymerization catalyst, such as an azonitrile, or a dialkyl or diacyl peroxide. The term "free radical polymerization catalyst" is also meant to include actinic radiation, and particularly ultraviolet light. The azonitrile catalysts which may be employed in this reaction are those set forth in detail in United States Patent No. 2,471,959 to Madison Hunt and include alpha, alpha'-azodiisobutyronitrile; alpha, alpha'-azobis-(alphamethylbutyronitrile); alpha, alpha' - azobis - (alpha-methylisocapronitrile) and the like. Suitable peroxide catalysts include the dialkyl peroxides such as di(tert-butyl) peroxides, and the diacyl peroxides such as butyryl, lauroyl and benzoyl peroxides. The amount of catalyst which may be used may vary over a wide range from 0.1% by weight upwards. From 1 to 5% by weight of catalyst, based on the total weight of the monomeric reactants, is ordinarily desirable. The azonitriles represent the preferred class of catalysts.

The interpolymerization may be carried out at any temperature short of the decomposition point of the chemicals involved. The lower temperature limit is that at which the reaction becomes impractically slow. The preferred range is from room temperature to about 75° C. The reaction will usually be carried out at atmospheric pressure, although higher or lower pressures may be used.

The two reactants may be used in equimolecular amounts or an excess of one reactant or the other may be used to serve as a reaction medium. The amount of each reactant present is preferably between 5 and 95% by weight of the total amount of reactants. If the olefinic compound is present in excess, the composition of the interpolymer will ordinarily be affected, since the excess material can take part in the polymerization. This is not true when the dihalophosphine is present in excess. The reaction is preferably conducted in the presence of a non-reactive medium such as petroleum ether, cyclohexane, benzene, carbon tetrachloride, chloroform and the like. The mixture should be free of substances capable of converting the dihalo compounds to the corresponding oxides, such as water, alcohols and carboxylic acids.

The products of the polymerization, containing dihalotertiaryphosphine groups, are yellow to tan in color and vary in consistency from oils to granular solids. They contain varying amounts of phosphorus, since homopolymerization of the unsaturated compound takes place at the same time and in competition with the interpolymerization. The extent to which the interpolymerization dominates is a function of the reactivities of the specific reagents under the particular reaction conditions. As the dihalophosphine does not react with itself, the maximum phosphorus content of the interpolymer is the theoretical value for a polymer in which one mole of olefine has reacted with each mole of phosphine. This value varies with the molecular weight of the reagents. The theoretical maximum phosphorus content of the interpolymers, after conversion to the phosphine oxides, is ordinarily from 10 to 20% by weight. Actually the interpolymer always contains somewhat less phorphorus than the theoretical. The heat resistance and hydropholic character of the polymers containing phosphine oxide groups increase in proportion to the amount of phosphorus present. As little as 0.1% phosphorus confers these properties on the polymer to a determinable extent, while at 2% phosphorus the effect is pronounced. Interpolymers containing from about 2 to 15% phosphorus represent the preferred class of products made according to this invention.

Conversion of the dihalotertiaryphosphine groups in the interpolymer to phosphine oxide groups is produced by treatment of the intermediate interpolymer with water, an alcohol or a carboxylic acid. The general formula of such compounds may be expressed as R'OH, where R' is hydrogen, a lower alkyl or a lower acyl radical. While water is of course the cheapest member of this group and will often be chosen for this reason, use of alcohols or acids affords an opportunity to obtain valuable alkyl or acyl halides as by-products. The particular hydrolytic agent selected will depend on the economics of the situation and on the availability of materials. Methanol, ethanol, propanol, butanol, formic acid, acetic acid, propionic acid and butyric acid are examples of compounds which may be used in place of water in this step.

The reaction to form the phosphine oxide groups is rapid and exothermic, and is operable at temperatures between 0° C. and well over 100° C. Operation between 0° and 100° C. will usually be most convenient. Because of the exothermic nature of the reaction, complete control at the higher temperatures sometimes requires special cooling or dilution with an inert solvent. An excess of the hydrolytic agent may be used although it is only necessary to have at least a molar equivalent present in order to produce a complete conversion to the oxide.

The products of this invention vary from clear oils to transparent glasses to powdery solids, some being nearly colorless and others cream-colored to reddish-brown. They are very stable thermally, withstanding temperatures up to at least 300° C. The phosphine oxide groups are relatively inert chemically. The polymers are useful as flameproofing agents for textiles and also in making molded articles and films. They may be incorporated into other polymers to modify certain properties. The hydrophilic nature of the phosphine oxide groups increases the ability of such polymers to absorb and to be wetted by hydroxyl-containing materials, making the polymers useful in diaphragms and other applications where this property is desired.

*Example 1*

A mixture of 44.8 grams of dichlorophenylphosphine in 50 ml. of cyclohexane, 13.3 grams of acrylonitrile and 1.5 grams of alpha, alpha'-azobis-(alpha-methylisocapronitrile) is warmed at 40° C. for about three days. The azonitrile catalyst is added in 0.5 gram portions over the three day period. A cream-colored solid interpolymer deposits during this time. The interpolymer is filtered and mixed with methanol. The evolution of methyl chloride gas indicates that conversion of dichlorotertiaryphosphine groups to phosphine oxide groups is taking place. The polymer is filtered from the methanol, giving 6.2 grams of a cream-colored solid (dry basis), which contains 2.5% P and 22.5% N.

*Example 2*

A mixture of 50.0 grams of dichlorophenylphosphine in 50 ml. of cyclohexane and 28.0 grams of methyl methacrylate is warmed at 60° C. for three days. A total of 1.5 grams of alpha, alpha' - azobis-(alpha-methylisocapronitrile) is added in three 0.5 gram portions during this period. At the end of this time, the fluid upper layer is decanted and the viscous colorless oily lower layer is treated with methanol to convert the dichlorotertiaryphosphine groups to phosphine oxide groups. The resulting plastic mass is washed with alcohol and dried to give 28.6 grams of clear glassy polymer containing 2.9% P.

*Example 3*

A mixture of 50.0 grams of dichlorophenylphosphine in 50 ml. of cyclohexane and 29.1 grams of styrene is warmed at 60° C. for two days. A total of 2.0 grams of alpha, alpha'-azobis-(alpha-methylisocapronitrile) is added in four 0.5 portions over the two day period. The supernatant liquid is decanted from the viscous colorless oily lower layer. Methanol is added to the polymeric material. The evolution of methyl chloride indicates the conversion of dichlorotertiaryphosphine groups to phosphine oxide groups. The mixture is then poured into water to precipitate the polymer. A white gummy mass is formed which gives, after drying, 17.6 grams of a glassy product containing 7.3% P.

*Example 4*

A mixture of 4.1 grams of dichlorophenylphosphine and 2.0 grams of allyl ethyl ether in 5 ml. of cyclohexane is warmed at 40° C. for seven days. Alpha, alpha'-azobis-(alpha-methylisocapronitrile, is added as polymerization catalyst in two 0.05 gram portions, one on the first and one on the fourth day. At the end of the seven days, a dark viscous oily lower layer has formed. This is washed with petroleum ether and treated with methanol. Methyl chloride is evolved. The methanol solution is diluted with water, giving an insoluble oil which is dried to give 2.5 grams of a clear reddish oil containing 15.1% P.

*Example 5*

A mixture of 50.0 grams of dichlorophenylphosphine, 19.1 grams of isoprene, 14.9 grams of acrylonitrile and 0.5 gram of alpha, alpha'-azobis-(alpha-methylisocapronitrile) in 50 ml. of cyclohexane is warmed at 40° C. for twenty hours. A white to cream-colored granular solid precipitates. This is filtered and treated with methanol. Methyl chloride is evolved, indicating the conversion of dichlorotertiaryphosphine groups to the corresponding phosphine oxide groups. The mixture is diluted with water, upon which an oily layer separates. This oil is washed with water and dried to give 20.0 grams of a transparent brownish glassy polymer containing 15.0% P and 0.9% N.

I claim:

1. In a process for preparing a heat-resistant interpolymer containing chemically bound phosphorus in the form of phosphine oxide groups, the step which comprises contacting a phosphorus-containing interpolymer of an olefinically unsaturated compound containing the formula $CH_2=C<$, selected from the group consisting of styrene, acrylonitrile, the lower alkyl allyl ethers and the lower alkyl esters of acrylic and of methacrylic acids, and a mono-substituted dihalophosphine having the formula $RPX_2$, in which R represents a member of the group consisting of alkyl, aryl and aralkyl radicals and X is a member of the group consisting of chlorine and bromine, with a hydroxyl-containing compound having the formula R'OH in which R' represents a member of the group consisting of hydrogen, lower alkyl and lower acyl radicals.

2. A process according to claim 1 in which the olefinically unsaturated compound is styrene.

3. A process according to claim 1 in which the olefinically unsaturated compound is acrylonitrile.

4. A process according to claim 1 in which the olefinically unsaturated compound is methyl methacrylate.

5. A process according to claim 1 in which the hydroxyl-containing compound is water.

6. A heat-resistant interpolymer containing at least 0.1% chemically bound phosphorus in the form of phosphine oxide groups, said polymer being prepared by the reaction of a hydroxyl-containing compound having the formula R'OH in which R' represents a member of the group consisting of hydrogen, lower alkyl and lower acyl radicals with an interpolymer of an olefinically unsaturated compound containing the radical $CH_2=C<$, selected from the group consisting of styrene, acrylonitrile, the lower alkyl allyl ethers, and the lower alkyl esters of acrylic and of methacrylic acids, and a mono-substituted dihalophosphine having the formula $RPX_2$ in which R represents a member of the group consisting of alkyl, aryl and aralkyl radicals and X is a member of the group consisting of chlorine and bromine.

7. The interpolymer of claim 6 in which the olefinically unsaturated compound is styrene.

8. The interpolymer of claim 6 in which the olefinically unsaturated compound is acrylonitrile.

9. The interpolymer of claim 6 in which the olefinically unsaturated compound is methyl methacrylate.

10. In a process for preparing a heat-resistant interpolymer containing chemically bound phosphorus in the form of phosphine oxide groups, the step which comprises contacting a phosphorus-containing interpolymer of styrene and dichlorophenylphosphine with methanol.

11. In a process for preparing a heat-resistant interpolymer containing chemically bound phosphorus in the form of phosphine oxide groups, the step which comprises contacting a phosphorus-containing interpolymer of acrylonitrile and dichlorophenylphosphine with methanol.

12. In a process for preparing a heat-resistant interpolymer containing chemically bound phosphorus in the form of phosphine oxide groups, the step which comprises contacing a phosphorus-containing interpolymer of methyl methacrylate and dichlorophenylphosphine with methanol.

WILLIAM B. McCORMACK.

References Cited in the file of this patent

UNITED STATES PATENTS

| Number | Name | Date |
|---|---|---|
| 2,382,812 | Parker | Aug. 14, 1945 |
| 2,387,521 | Martin | Oct. 23, 1945 |
| 2,520,601 | Lee | Aug. 29, 1950 |